United States Patent
Uchino et al.

(10) Patent No.: US 9,596,699 B2
(45) Date of Patent: Mar. 14, 2017

(54) MOBILE COMMUNICATION METHOD, RADIO BASE STATION, AND MOBILE STATION

(71) Applicant: NTT DOCOMO, INC., Tokyo (JP)

(72) Inventors: Tooru Uchino, Tokyo (JP); Sadayuki Abeta, Tokyo (JP); Anil Umesh, Tokyo (JP); Hideaki Takahashi, Tokyo (JP); Yuta Sagae, Tokyo (JP); Daisuke Nishikawa, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 85 days.

(21) Appl. No.: 14/375,880

(22) PCT Filed: Jan. 31, 2013

(86) PCT No.: PCT/JP2013/052189
§ 371 (c)(1),
(2) Date: Jul. 31, 2014

(87) PCT Pub. No.: WO2013/115309
PCT Pub. Date: Aug. 8, 2013

(65) Prior Publication Data
US 2015/0023268 A1    Jan. 22, 2015

(30) Foreign Application Priority Data
Feb. 3, 2012  (JP) .................. 2012-022547

(51) Int. Cl.
*H04W 4/00* (2009.01)
*H04W 72/12* (2009.01)
(Continued)

(52) U.S. Cl.
CPC ...... *H04W 72/1284* (2013.01); *H04B 7/0613* (2013.01); *H04L 5/0092* (2013.01);
(Continued)

(58) Field of Classification Search
USPC ......... 370/277–281, 329–345; 450/450–452; 455/450–466
See application file for complete search history.

(56) References Cited

U.S. PATENT DOCUMENTS

| | | | | |
|---|---|---|---|---|
| 7,957,351 B2* | 6/2011 | Casaccia | ............. | H04B 7/0871 370/334 |
| 8,737,348 B2* | 5/2014 | Oh | ........................ | H04L 5/0058 370/252 |

(Continued)

FOREIGN PATENT DOCUMENTS

| JP | 2011-091747 A | 5/2011 |
|---|---|---|
| JP | 2011-971747 A | 5/2011 |

(Continued)

OTHER PUBLICATIONS

Office Action issued in corresponding Japanese Application No. 2012-022547, mailed Sep. 29, 2015 (6 pages).

(Continued)

*Primary Examiner* — Man Phan
(74) *Attorney, Agent, or Firm* — Osha Liang LLP

(57) ABSTRACT

An objective is to improve communication quality by reducing an insertion loss or the like of a diplexer inserted to reduce a leakage from an uplink band to a downlink band in different bands. A mobile communication method according to the present invention includes the steps of: transmitting simultaneous transmission capability information from a mobile station UE to a radio base station eNB, the simultaneous transmission capability information indicating whether or not the mobile station UE can transmit uplink data signals via multiple carriers in the same sub-frame while performing uplink CA; performing scheduling for the mobile station UE by the radio base station eNB on the basis of the simultaneous transmission capability information; and (Continued)

performing communication by the mobile station UE on the basis of the scheduling information.

3 Claims, 19 Drawing Sheets

(51) Int. Cl.
*H04W 72/04* (2009.01)
*H04B 7/06* (2006.01)
*H04L 5/00* (2006.01)
*H04W 8/22* (2009.01)

(52) U.S. Cl.
CPC ..... *H04W 72/048* (2013.01); *H04W 72/0413* (2013.01); *H04W 8/22* (2013.01)

(56) References Cited

U.S. PATENT DOCUMENTS

| | | | | |
|---|---|---|---|---|
| 8,824,403 | B2* | 9/2014 | Oh | H04L 5/0092 370/252 |
| 9,166,852 | B2* | 10/2015 | Davierwalla | H03G 3/20 |
| 9,172,402 | B2* | 10/2015 | Gudem | H04B 1/0057 |
| 9,178,669 | B2* | 11/2015 | Fernando | H04L 5/00 |
| 2010/0014467 | A1* | 1/2010 | Wang | H04W 72/0413 370/329 |
| 2012/0243450 | A1* | 9/2012 | Ishii | H04L 5/0007 370/281 |
| 2012/0257588 | A1* | 10/2012 | Umeda | H04L 5/001 370/329 |
| 2012/0322455 | A1 | 12/2012 | Oh | |
| 2014/0112298 | A1* | 4/2014 | Oh | H04L 5/0092 370/329 |
| 2015/0230233 | A1* | 8/2015 | Kobayashi | H04W 72/048 370/329 |

FOREIGN PATENT DOCUMENTS

| | | |
|---|---|---|
| JP | 2011-182104 A | 9/2011 |
| WO | 2011/043392 A1 | 4/2011 |
| WO | 2011/043396 A1 | 4/2011 |
| WO | 2011/105261 A1 | 9/2011 |

OTHER PUBLICATIONS

International Search Report for corresponding International Application No. PCT/JP2013/052189, mailed Apr. 16, 2013 (1 page).
3GPP TS 36.101 V10.5.0; "3rd Generation Partnership Project; Technical Specification Group Radio Access Network; Evolved Universal Terrestrial Radio Access (E-UTRA); User Equipment (UE) radio transmission and reception (Release 10);" Dec. 2011 (287 pages).
Extended Search Report issued in corresponding European Application No. 13743891.7, mailed Aug. 20, 2015 (7 pages).
Written Opinion issued in corresponding international application No. PCT/JP2013/052189, mailed Apr. 16, 2013 (7 pages).
Office Action issued in the counterpart Japanese Patent Application No. 2012-022547, mailed May 10, 2016 (4 pages).

* cited by examiner

FIG. 3

UE-EUTRA-Capability information element

```
-- ASN1START

UE-EUTRA-Capability ::=          SEQUENCE {
    ...
    rf-Parameters                   RF-Parameters,
    ...
    },
    nonCriticalExtension            UE-EUTRA-Capability-v920-IEs        OPTIONAL
}

...
UE-EUTRA-Capability-v1020-IEs ::= SEQUENCE {
    ue-Category-v1020               INTEGER (6..8)                      OPTIONAL,
    phyLayerParameters-v1020        PhyLayerParameters-v1020            OPTIONAL,
    rf-Parameters-v1020             RF-Parameters-v1020                 OPTIONAL,
    ...
}
...

RF-Parameters ::=                SEQUENCE {
    supportedBandListEUTRA          SupportedBandListEUTRA
}

RF-Parameters-v1020 ::=          SEQUENCE {
    supportedBandCombination-r10        SupportedBandCombination-r10
}

SupportedBandCombination-r10 ::= SEQUENCE (SIZE (1..maxBandCombr-10)) OF BandCombinationParameters-r10

BandCombinationParameters-r10 ::= SEQUENCE (SIZE (1..maxSimultaneousBands-r10)) OF BandParameters-r10

BandParameters-r10 ::= SEQUENCE {
    bandEUTRA-r10                   INTEGER (1..64),
    bandParametersUL-r10            BandParametersUL-r10                OPTIONAL,
    bandParametersDL-r10            BandParametersDL-r10                OPTIONAL
}

BandParametersUL-r10 ::= SEQUENCE (SIZE (1..maxBandwidthClass-r10)) OF CA-MIMO-ParametersUL-r10

CA-MIMO-ParametersUL-r10 ::= SEQUENCE {
    ca-BandwidthClassUL-r10         CA-BandwidthClass-r10,
    supportedMIMO-CapabilityUL-r10  MIMO-CapabilityUL-r10               OPTIONAL
}

BandParametersDL-r10 ::= SEQUENCE (SIZE (1..maxBandwidthClass-r10)) OF CA-MIMO-ParametersDL-r10

CA-MIMO-ParametersDL-r10 ::= SEQUENCE {
    ca-BandwidthClassDL-r10         CA-BandwidthClass-r10,
    supportedMIMO-CapabilityDL-r10  MIMO-CapabilityDL-r10               OPTIONAL
}

CA-BandwidthClass-r10 ::= ENUMERATED {a, b, c, d, e, f, ...,g}

...

-- ASN1STOP
```

| UE-EUTRA-Capability field descriptions |
|---|
| CA-BandwidthClass |
| The CA bandwidth class supported by the UE as defined in TS 36.101 [42, Table 5.6A-1]. |

FIG. 4

| CA Bandwidth Class | Aggregated Transmission Bandwidth Configuration | Maximum number of CC | Nominal Guard Band BW$_{GB}$ | Number of simultaneous transmission |
|---|---|---|---|---|
| A | N$_{RB,agg}$ ≤ 100 | 1 | 0.05BW$_{Channel(1)}$ | 1 |
| B | N$_{RB,agg}$ ≤ 100 | 2 | FFS | 2 |
| C | 100 < N$_{RB,agg}$ ≤ 200 | 2 | 0.05 max(BW$_{Channel(1)}$, BW$_{Channel(2)}$) | FFS |
| D | 200 < N$_{RB,agg}$ ≤ [300] | FFS | FFS | FFS |
| E | [300] < N$_{RB,agg}$ ≤ [400] | FFS | FFS | FFS |
| F | [400] < N$_{RB,agg}$ ≤ [500] | FFS | FFS | FFS |
| G | N$_{RB,agg}$ ≤ 100 | 1 | FFS | 1 |

Note 1: BW$_{Channel(1)}$ and BW$_{Channel(2)}$ are channel bandwidths of two E-UTRA component carriers according to Table 5.6-1.

FIG. 5

UE-EUTRA-Capability information element

```
-- ASN1START

UE-EUTRA-Capability ::=         SEQUENCE {
...
    rf-Parameters               RF-Parameters,
...
    },
    nonCriticalExtension        UE-EUTRA-Capability-v920-IEs    OPTIONAL
}

...
UE-EUTRA-Capability-v1020-IEs ::= SEQUENCE {
    ue-Category-v1020           INTEGER (6..8)                  OPTIONAL,
    phyLayerParameters-v1020    PhyLayerParameters-v1020        OPTIONAL,
    rf-Parameters-v1020         RF-Parameters-v1020             OPTIONAL,
    ...
}

...

RF-Parameters ::=               SEQUENCE {
    supportedBandListEUTRA          SupportedBandListEUTRA
}

RF-Parameters-v1020 ::=         SEQUENCE {
    supportedBandCombination-r10    SupportedBandCombination-r10
}

SupportedBandCombination-r10 ::= SEQUENCE (SIZE (1..maxBandComb-r10)) OF BandCombinationParameters-r10

BandCombinationParameters-r10 ::= SEQUENCE (SIZE (1..maxSimultaneousBands-r10)) OF BandParameters-r10

BandParameters-r10 ::= SEQUENCE {
    bandEUTRA-r10               INTEGER (1..64),
    bandParametersUL-r10        BandParametersUL-r10            OPTIONAL,
    bandParametersDL-r10        BandParametersDL-r10            OPTIONAL
}

BandParametersUL-r10 ::= SEQUENCE (SIZE (1..maxBandwidthClass-r10)) OF CA-MIMO-ParametersUL-r10

CA-MIMO-ParametersUL-r10 ::= SEQUENCE {
    ca-BandwidthClassUL-r10     CA-BandwidthClass-r10,
    supportedMIMO-CapabilityUL-r10  MIMO-CapabilityUL-r10       OPTIONAL
}

BandParametersDL-r10 ::= SEQUENCE (SIZE (1..maxBandwidthClass-r10)) OF CA-MIMO-ParametersDL-r10

CA-MIMO-ParametersDL-r10 ::= SEQUENCE {
    ca-BandwidthClassDL-r10     CA-BandwidthClass-r10,
    supportedMIMO-CapabilityDL-r10  MIMO-CapabilityDL-r10       OPTIONAL
}

CA-BandwidthClass-r10 ::= ENUMERATED {a, b, c, d, e, f, ...,g,h,i]

...

-- ASN1STOP
```

| UE-EUTRA-Capability field descriptions |
|---|
| CA-BandwidthClass |
| The CA bandwidth class supported by the UE as defined in TS 36.101 [42, Table 5.6A-1]. |

FIG. 6

| CA Bandwidth Class | Aggregated Transmission Bandwidth Configuration | Maximum number of CC | Nominal Guard Band $BW_{GB}$ | Number of simultaneous DL transmission | Number of simultaneous UL transmission |
|---|---|---|---|---|---|
| A | $N_{RB,agg} \leq 100$ | 1 | $0.05BW_{Channel(1)}$ | 1 | 1 |
| B | $N_{RB,agg} \leq 100$ | 2 | FFS | 2 | 2 |
| C | $100 < N_{RB,agg} \leq 200$ | 2 | $0.05\,max(BW_{Channel(1)}, BW_{Channel(2)})$ | FFS | FFS |
| D | $200 < N_{RB,agg} \leq [300]$ | FFS | FFS | FFS | FFS |
| E | $[300] < N_{RB,agg} \leq [400]$ | FFS | FFS | FFS | FFS |
| F | $[400] < N_{RB,agg} \leq [500]$ | FFS | FFS | FFS | FFS |
| G | $N_{RB,agg} \leq 100$ | 2 | FFS | 1 | 1 |
| H | $N_{RB,agg} \leq 100$ | 2 | FFS | 2 | 1 |
| I | $N_{RB,agg} \leq 100$ | 2 | FFS | 1 | 2 |

Note 1: $BW_{Channel(1)}$ and $BW_{Channel(2)}$ are channel bandwidths of two E-UTRA component carriers according to Table 5.6-1.

FIG. 7

*UE-EUTRA-Capability* information element

```
-- ASN1START
UE-EUTRA-Capability ::=            SEQUENCE {
 ...
 },
    nonCriticalExtension           UE-EUTRA-Capability-v920-IEs     OPTIONAL
}
UE-EUTRA-Capability-v920-IEs  ::=  SEQUENCE {
...
    nonCriticalExtension           UE-EUTRA-Capability-v940-IEs     OPTIONAL
}
UE-EUTRA-Capability-v940-IEs ::=   SEQUENCE {
    lateNonCriticalExtension       OCTET    STRING                  OPTIONAL,
    nonCriticalExtension           UE-EUTRA-Capability-v1020-IEs    OPTIONAL
}
UE-EUTRA-Capability-v1020-IEs ::=  SEQUENCE {
    ...
    nonCriticalExtension           UE-EUTRA-Capability-v11xy-IEs
    OPTIONAL
}
UE-EUTRA-Capability-v11xy-IEs ::=  SEQUENCE {
    rf-Parameters-v11xy            RF-Parameters-v11xy              OPTIONAL,
    nonCriticalExtension           SEQUENCE     {}                  OPTIONAL
}
```

| Example: SIMULTANEOUS TRANSMISSION Capability FOR EACH UE (DEFINED FOR UL ONLY) |
|---|

```
Rf-Parameters-v11xy   ::=          SEQUENCE{
    supportedBandCombinationSimultaneous-r10   SupportedBandCombination-r10
    simultaneousTx-r11                         ENUMERATED{supported}        OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10              INTEGER    (1..64),
    bandParametersUL-r10       BandParametersUL-r10                 OPTIONAL,
    bandParametersDL-r10       BandParametersDL-r10                 OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10            CA-BandwidthClass-r10,
    supportedMIMO-CapabilityUL-r10     MIMO-CapabilityUL-r10        OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10            CA-BandwidthClass-r10,
    supportedMIMO-CapabilityDL-r10     MIMO-CapabilityDL-r10        OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 8

*UE-EUTRA-Capability* information element

```
-- ASN1START
UE-EUTRA-Capability ::=            SEQUENCE {
...
   },
   nonCriticalExtension            UE-EUTRA-Capability-v920-IEs      OPTIONAL
}
UE-EUTRA-Capability-v920-IEs  ::=  SEQUENCE {
...
   nonCriticalExtension            UE-EUTRA-Capability-v940-IEs      OPTIONAL
}
UE-EUTRA-Capability-v940-IEs ::=   SEQUENCE {
   lateNonCriticalExtension        OCTET   STRING                    OPTIONAL,
   nonCriticalExtension            UE-EUTRA-Capability-v1020-IEs     OPTIONAL
}
UE-EUTRA-Capability-v1020-IEs ::=  SEQUENCE {
...
   nonCriticalExtension            UE-EUTRA-Capability-v11xy-IEs
   OPTIONAL
}
UE-EUTRA-Capability-v11xy-IEs ::=  SEQUENCE {
   rf-Parameters-v11xy             RF-Parameters-v11xy               OPTIONAL,
   nonCriticalExtension            SEQUENCE  {}                      OPTIONAL
}
```

```
   Example: SIMULTANEOUS TRANSMISSION/RECEPTION Capability FOR EACH UE (COMMON TO DL AND UL)
```

```
Rf-Parameters-v11xy    ::=          SEQUENCE{
   supportedBandCombinationSimultaneous-r10    SupportedBandCombination-r10
   simultaneousTxRx-r11                         ENUMERATED{supported}     OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
   bandEUTRA-r10                INTEGER   (1..64),
   bandParametersUL-r10         BandParametersUL-r10                 OPTIONAL,
   bandParametersDL-r10         BandParametersDL-r10                 OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
   ca-BandwidthClassUL-r10      CA-BandwidthClass-r10,
   supportedMIMO-CapabilityUL-r10   MIMO-CapabilityUL-r10            OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
   ca-BandwidthClassDL-r10      CA-BandwidthClass-r10,
   supportedMIMO-CapabilityDL-r10   MIMO-CapabilityDL-r10            OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}
-- ASN1STOP
```

FIG. 9

UE-EUTRA-Capability information element

```
-- ASN1START
UE-EUTRA-Capability ::=            SEQUENCE {
...
    },
    nonCriticalExtension           UE-EUTRA-Capability-v920-IEs        OPTIONAL
}
UE-EUTRA-Capability-v920-IEs ::=   SEQUENCE {
...
    nonCriticalExtension           UE-EUTRA-Capability-v940-IEs        OPTIONAL
}
UE-EUTRA-Capability-v940-IEs ::=   SEQUENCE {
    lateNonCriticalExtension       OCTET    STRING                     OPTIONAL,
    nonCriticalExtension           UE-EUTRA-Capability-v1020-IEs       OPTIONAL
}
UE-EUTRA-Capability-v1020-IEs ::=  SEQUENCE {
...
    nonCriticalExtension           UE-EUTRA-Capability-v11xy-IEs
    OPTIONAL
}
UE-EUTRA-Capability-v11xy-IEs ::=  SEQUENCE {
    rf-Parameters-v11xy            RF-Parameters-v11xy                 OPTIONAL,
    nonCriticalExtension           SEQUENCE    {}                      OPTIONAL
}
```

Example: SIMULTANEOUS TRANSMISSION/RECEPTION Capability FOR EACH UE (INDIVIDUAL FOR DL AND UL)

```
Rf-Parameters-v11xy   ::=          SEQUENCE{
    supportedBandCombinationSimultaneous-r10   SupportedBandCombination-r10
    simultaneousTx-r11                         ENUMERATED{supported}    OPTIONAL
    simultaneousRx-r11                         ENUMERATED{supported}    OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10              INTEGER    (1..64),
    bandParametersUL-r10       BandParametersUL-r10                    OPTIONAL,
    bandParametersDL-r10       BandParametersDL-r10                    OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10           CA-BandwidthClass-r10,
    supportedMIMO-CapabilityUL-r10    MIMO-CapabilityUL-r10            OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10           CA-BandwidthClass-r10,
    supportedMIMO-CapabilityDL-r10    MIMO-CapabilityDL-r10            OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 10

UE-EUTRA-Capability information element

```
-- ASN1START
UE-EUTRA-Capability ::=          SEQUENCE {
...
    },
    nonCriticalExtension           UE-EUTRA-Capability-v920-IEs       OPTIONAL
}
UE-EUTRA-Capability-v920-IEs  ::=     SEQUENCE {
...
    nonCriticalExtension           UE-EUTRA-Capability-v940-IEs       OPTIONAL
}
UE-EUTRA-Capability-v940-IEs ::=  SEQUENCE {
    lateNonCriticalExtension       OCTET    STRING                    OPTIONAL,
    nonCriticalExtension           UE-EUTRA-Capability-v1020-IEs      OPTIONAL
}
UE-EUTRA-Capability-v1020-IEs ::= SEQUENCE {
...
    nonCriticalExtension           UE-EUTRA-Capability-v11xy-IEs
    OPTIONAL
}
UE-EUTRA-Capability-v11xy-IEs ::=    SEQUENCE {
    rf-Parameters-v11xy             RF-Parameters-v11xy                OPTIONAL,
    nonCriticalExtension            SEQUENCE {}                        OPTIONAL
}
```

Example: SIMULTANEOUS TRANSMISSION/RECEPTION Capability FOR EACH BAND COMBINATION (FOR UL ONLY)

```
Rf-Parameters-v11xy    ::=             SEQUENCE{
    supportedBandCombinationSimultaneous-r11    SupportedBandCombination-r11
}
SupportedBandCombination-r11 ::= SEQUENCE (SIZE ()) OF SupportedBandCombinationParameters-11
SupportedBandCombinationParameters-r11 ::= SEQUENCE {
    bandCominationParameter-r10     BandCombinationParameters-r10
    simultaneousTx-r11              ENUMERATED{supported}              OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                   INTEGER   (1..64),
    bandParametersUL-r10            BandParametersUL-r10                OPTIONAL,
    bandParametersDL-r10            BandParametersDL-r10                OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10         CA-BandwidthClass-r10,
    supportedMIMO-CapabilityUL-r10  MIMO-CapabilityUL-r10               OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10         CA-BandwidthClass-r10,
    supportedMIMO-CapabilityDL-r10  MIMO-CapabilityDL-r10               OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 11

*UE-EUTRA-Capability* information element

```
-- ASN1START
UE-EUTRA-Capability ::=         SEQUENCE {
    ...
    },
    nonCriticalExtension             UE-EUTRA-Capability-v920-IEs         OPTIONAL
}
UE-EUTRA-Capability-v920-IEs  ::=    SEQUENCE {
    ...
    nonCriticalExtension             UE-EUTRA-Capability-v940-IEs         OPTIONAL
}
UE-EUTRA-Capability-v940-IEs ::=    SEQUENCE {
    lateNonCriticalExtension         OCTET    STRING                      OPTIONAL,
    nonCriticalExtension             UE-EUTRA-Capability-v1020-IEs        OPTIONAL
}
UE-EUTRA-Capability-v1020-IEs ::=   SEQUENCE {
    ...
    nonCriticalExtension             UE-EUTRA-Capability-v11xy-IEs
    OPTIONAL
}
UE-EUTRA-Capability-v11xy-IEs ::=   SEQUENCE {
    rf-Parameters-v11xy              RF-Parameters-v11xy                  OPTIONAL,
    nonCriticalExtension             SEQUENCE    {}                       OPTIONAL
}
```

Example: SIMULTANEOUS TRANSMISSION/RECEPTION Capability FOR EACH BAND COMBINATION (COMMON TO DL AND UL)

```
Rf-Parameters-v11xy    ::=            SEQUENCE{
    supportedBandCombinationSimultaneous-r11    SupportedBandCombination-r11
}

SupportedBandCombination-r11 ::= SEQUENCE (SIZE ()) OF SupportedBandCombinationParameters-11

SupportedBandCombinationParameters-r11 ::= SEQUENCE {
    bandCombinationParameter-r10       BandCombinationParameters-r10
    simultaneousTxRx-r11               ENUMERATED{supported}              OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10                      INTEGER    (1..64),
    bandParametersUL-r10               BandParametersUL-r10               OPTIONAL,
    bandParametersDL-r10               BandParametersDL-r10               OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10            CA-BandwidthClass-r10
    supportedMIMO-CapabilityUL-r10     MIMO-CapabilityUL-r10              OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10            CA-BandwidthClass-r10,
    supportedMIMO-CapabilityDL-r10     MIMO-CapabilityDL-r10              OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 12

*UE-EUTRA-Capability* information element

```
-- ASN1START
UE-EUTRA-Capability ::=           SEQUENCE {
...
},
    nonCriticalExtension              UE-EUTRA-Capability-v920-IEs     OPTIONAL
}
UE-EUTRA-Capability-v920-IEs  ::=    SEQUENCE  {
...
    nonCriticalExtension              UE-EUTRA-Capability-v940-IEs     OPTIONAL
}
UE-EUTRA-Capability-v940-IEs ::=  SEQUENCE {
    lateNonCriticalExtension          OCTET    STRING                  OPTIONAL,
    nonCriticalExtension              UE-EUTRA-Capability-v1020-IEs    OPTIONAL
}
UE-EUTRA-Capability-v1020-IEs ::=  SEQUENCE {
...
    nonCriticalExtension              UE-EUTRA-Capability-v11xy-IEs
OPTIONAL
}
UE-EUTRA-Capability-v11xy-IEs ::=    SEQUENCE {
    rf-Parameters-v11xy               RF-Parameters-v11xy              OPTIONAL,
    nonCriticalExtension              SEQUENCE  {}                     OPTIONAL
}
```

Example: SIMULTANEOUS TRANSMISSION/RECEPTION Capability FOR EACH BAND COMBINATION (INDIVIDUAL FOR DL AND UL)

```
Rf-Parameters-v11xy    ::=           SEQUENCE{
    supportedBandCombinationSimultaneous-r11       SupportedBandCombination-r11
}

SupportedBandCombination-r11 ::= SEQUENCE (SIZE ()) OF SupportedBandCombinationParameters-11

SupportedBandCombinationParameters-r11 ::= SEQUENCE {
    bandCominationParameter-r10       BandCombinationParameters-r10
    simultaneousTx-r11                ENUMERATED{supported}            OPTIONAL
    simultaneousRx-r11                ENUMERATED{supported}            OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10                     INTEGER   (1..64),
    bandParametersUL-r10              BandParametersUL-r10             OPTIONAL,
    bandParametersDL-r10              BandParametersDL-r10             OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10           CA-BandwidthClass-r10,
    supportedMIMO-CapabilityUL-r10    MIMO-CapabilityUL-r10            OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10           CA-BandwidthClass-r10,
    supportedMIMO-CapabilityDL-r10    MIMO-CapabilityDL-r10            OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 13

*UE-EUTRA-Capability* information element

```
-- ASN1START
UE-EUTRA-Capability ::=         SEQUENCE {
...
    },
    nonCriticalExtension        UE-EUTRA-Capability-v920-IEs        OPTIONAL
}
UE-EUTRA-Capability-v920-IEs  ::=   SEQUENCE  {
...
    nonCriticalExtension        UE-EUTRA-Capability-v940-IEs        OPTIONAL
}
UE-EUTRA-Capability-v940-IEs ::=    SEQUENCE {
    lateNonCriticalExtension        OCTET   STRING                  OPTIONAL,
    nonCriticalExtension            UE-EUTRA-Capability-v1020-IEs   OPTIONAL
}
UE-EUTRA-Capability-v1020-IEs ::=   SEQUENCE {
...
    nonCriticalExtension        UE-EUTRA-Capability-v11xy-IEs
    OPTIONAL
}
UE-EUTRA-Capability-v11xy-IEs ::=   SEQUENCE {
    rf-Parameters-v11xy             RF-Parameters-v11xy             OPTIONAL,
    nonCriticalExtension            SEQUENCE  {}                    OPTIONAL
}
```

```
    Example: SIMULTANEOUS TRANSMISSION/RECEPTION Capability FOR EACH BAND (FOR UL ONLY)
```

```
RF-Parameters-v11xy     ::=         SEQUENCE  {
    supportedBandCombination-r11            SupportedBandCombination-r11
}

SupportedBandCombination-r11 ::= SEQUENCE (SIZE (1..maxBandComb-r11)) OF BandCombinationParameters-r11

SupportedBandCombinationParameters-r11 ::= SEQUENCE {

BandCombinationParameters-r11 ::= SEQUENCE (SIZE (1..maxSimultaneousBands-r11)) OF BandParameters-r11

BandParameters-r11 ::= SEQUENCE {
    bandEUTRA-r10               INTEGER  (1..64),
    bandParametersUL-r10        BandParametersUL-r10                OPTIONAL,
    bandParametersDL-r10        BandParametersDL-r10                OPTIONAL
    simultaneousTx-r11          ENUMERATED{supported}               OPTIONAL
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10               INTEGER   (1..64),
    bandParametersUL-r10        BandParametersUL-r10                OPTIONAL,
    bandParametersDL-r10        BandParametersDL-r10                OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10         CA-BandwidthClass-r10,
    supportedMIMO-CapabilityUL-r10  MIMO-CapabilityUL-r10           OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10         CA-BandwidthClass-r10,
    supportedMIMO-CapabilityDL-r10  MIMO-CapabilityDL-r10           OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 14

*UE-EUTRA-Capability* information element

```
-- ASN1START
UE-EUTRA-Capability ::=          SEQUENCE {
...
    },
    nonCriticalExtension         UE-EUTRA-Capability-v920-IEs     OPTIONAL
}
UE-EUTRA-Capability-v920-IEs  ::=    SEQUENCE   {
...
    nonCriticalExtension          UE-EUTRA-Capability-v940-IEs     OPTIONAL
}
UE-EUTRA-Capability-v940-IEs ::=  SEQUENCE {
    lateNonCriticalExtension      OCTET     STRING                 OPTIONAL,
    nonCriticalExtension          UE-EUTRA-Capability-v1020-IEs    OPTIONAL
}
UE-EUTRA-Capability-v1020-IEs ::=  SEQUENCE {
    ...
    nonCriticalExtension          UE-EUTRA-Capability-v11xy-IEs
    OPTIONAL
}
UE-EUTRA-Capability-v11xy-IEs ::=    SEQUENCE {
    rf-Parameters-v11xy           RF-Parameters-v11xy              OPTIONAL,
    nonCriticalExtension          SEQUENCE      {}                 OPTIONAL
}
```

```
Example: SIMULTANEOUS TRANSMISSION/RECEPTION Capability FOR EACH BAND (COMMON TO DL AND UL)
```

```
RF-Parameters-v11xy   ::=        SEQUENCE  {
    supportedBandCombination-r11      SupportedBandCombination-r11
}

SupportedBandCombination-r11 ::= SEQUENCE (SIZE (1..maxBandComb-r11)) OF BandCombinationParameters-r11

BandCombinationParameters-r11 ::= SEQUENCE (SIZE (1..maxSimultaneousBands-r11)) OF BandParameters-r11

BandParameters-r11  ::= SEQUENCE {
    bandEUTRA-r10              INTEGER   (1..64),
    bandParametersUL-r10       BandParametersUL-r10              OPTIONAL,
    bandParametersDL-r10       BandParametersDL-r10              OPTIONAL
    simultaneousTxRx-r11       ENUMERATED{supported}             OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10              INTEGER    (1..64),
    bandParametersUL-r10       BandParametersUL-r10              OPTIONAL,
    bandParametersDL-r10       BandParametersDL-r10              OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10           CA-BandwidthClass-r10,
    supportedMIMO-CapabilityUL-r10    MIMO-CapabilityUL-r10      OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10           CA-BandwidthClass-r10,
    supportedMIMO-CapabilityDL-r10    MIMO-CapabilityDL-r10      OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 15

UE-EUTRA-Capability information element

```
-- ASN1START
UE-EUTRA-Capability ::=            SEQUENCE {
...
    },
    nonCriticalExtension           UE-EUTRA-Capability-v920-IEs       OPTIONAL
}
UE-EUTRA-Capability-v920-IEs  ::=  SEQUENCE {
...
    nonCriticalExtension           UE-EUTRA-Capability-v940-IEs       OPTIONAL
}
UE-EUTRA-Capability-v940-IEs ::=   SEQUENCE {
    lateNonCriticalExtension       OCTET    STRING                    OPTIONAL,
    nonCriticalExtension           UE-EUTRA-Capability-v1020-IEs      OPTIONAL
}
UE-EUTRA-Capability-v1020-IEs ::=  SEQUENCE {
...
    nonCriticalExtension           UE-EUTRA-Capability-v11xy-IEs
    OPTIONAL
}
UE-EUTRA-Capability-v11xy-IEs ::=  SEQUENCE {
    rf-Parameters-v11xy            RF-Parameters-v11xy                OPTIONAL,
    nonCriticalExtension           SEQUENCE  {}                       OPTIONAL
}
```

```
 Example: SIMULTANEOUS TRANSMISSION/RECEPTION Capability FOR EACH BAND (INDIVIDUAL FOR DL AND UL)
```

```
RF-Parameters-v11xy  ::=          SEQUENCE {
    supportedBandCombination-r11          SupportedBandCombination-r11
}

SupportedBandCombination-r11 ::= SEQUENCE (SIZE (1..maxBandComb-r11)) OF BandCombinationParameters-
r11

BandCombinationParameters-r11 ::= SEQUENCE (SIZE (1..maxSimultaneousBands-r11)) OF BandParameters
r11

BandParameters-r11 ::= SEQUENCE {
    bandEUTRA-r10                INTEGER  (1..64),
    bandParametersUL-r10         BandParametersUL-r10                 OPTIONAL,
    bandParametersDL-r10         BandParametersDL-r10                 OPTIONAL
    simultaneousTx-r11           ENUMERATED{supported}                OPTIONAL
    simultaneousRx-r11           ENUMERATED{supported}                OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                INTEGER   (1..64),
    bandParametersUL-r10         BandParametersUL-r10                 OPTIONAL,
    bandParametersDL-r10         BandParametersDL-r10                 OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10          CA-BandwidthClass-r10,
    supportedMIMO-CapabilityUL-r10   MIMO-CapabilityUL-r10            OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10          CA-BandwidthClass-r10,
    supportedMIMO-CapabilityDL-r10   MIMO-CapabilityDL-r10            OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 16

*UE-EUTRA-Capability* information element

```
-- ASN1START
UE-EUTRA-Capability ::=            SEQUENCE {
...
    },
    nonCriticalExtension           UE-EUTRA-Capability-v920-IEs       OPTIONAL
}
UE-EUTRA-Capability-v920-IEs ::=   SEQUENCE {
...
    nonCriticalExtension           UE-EUTRA-Capability-v940-IEs       OPTIONAL
}
UE-EUTRA-Capability-v940-IEs ::=   SEQUENCE {
    lateNonCriticalExtension       OCTET    STRING                    OPTIONAL,
    nonCriticalExtension           UE-EUTRA-Capability-v1020-IEs      OPTIONAL
}
UE-EUTRA-Capability-v1020-IEs ::=  SEQUENCE {
...
    nonCriticalExtension           UE-EUTRA-Capability-v11xy-IEs
OPTIONAL
}
UE-EUTRA-Capability-v11xy-IEs ::=  SEQUENCE {
    rf-Parameters-v11xy            RF-Parameters-v11xy                OPTIONAL,
    nonCriticalExtension           SEQUENCE   {}                      OPTIONAL
}
```

```
Example: SIMULTANEOUS TRANSMISSION/RECEPTION Capability FOR EACH CABandClass (FOR UL ONLY)
```

```
RF-Parameters-v11xy  ::=           SEQUENCE {
    supportedBandCombination-r11        SupportedBandCombination-r11
}

SupportedBandCombination-r11 ::= SEQUENCE (SIZE (1..maxBandComb-r11)) OF BandCombinationParameters-
r11

BandCombinationParameters-r11 ::= SEQUENCE (SIZE (1..maxSimultaneousBands-r11)) OF BandParameters-
r11

BandParameters-r11 ::= SEQUENCE {
    bandEUTRA-r10                  INTEGER (1..64),
    bandParametersUL-r11           BandParametersUL-r11               OPTIONAL,
    bandParametersDL-r10           BandParametersDL-r10               OPTIONAL
}

BandParametersUL-r11 ::= SEQUENCE (SIZE (1..maxBandwidthClass-r11)) OF CA-MIMO-ParametersUL-r11

CA-MIMO-ParametersUL-r11 ::= SEQUENCE {
    ca-BandwidthClassUL-r10        CA-BandwidthClass-r10,
    simultaneousTx-r11             ENUMERATED{supported}              OPTIONAL
    supportedMIMO-CapabilityUL-r10 MIMO-CapabilityUL-r10              OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                  INTEGER  (1..64),
    bandParametersUL-r10           BandParametersUL-r10               OPTIONAL,
    bandParametersDL-r10           BandParametersDL-r10               OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10        CA-BandwidthClass-r10,
    supportedMIMO-CapabilityUL-r10 MIMO-CapabilityUL-r10              OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10        CA-BandwidthClass-r10,
    supportedMIMO-CapabilityDL-r10 MIMO-CapabilityDL-r10              OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 17

*UE-EUTRA-Capability* information element

```
-- ASN1START
UE-EUTRA-Capability ::=         SEQUENCE {
...
},
    nonCriticalExtension        UE-EUTRA-Capability-v920-IEs    OPTIONAL
}
UE-EUTRA-Capability-v920-IEs  ::=    SEQUENCE {
...
    nonCriticalExtension        UE-EUTRA-Capability-v940-IEs    OPTIONAL
}
UE-EUTRA-Capability-v940-IEs ::=  SEQUENCE {
    lateNonCriticalExtension    OCTET    STRING                 OPTIONAL,
    nonCriticalExtension        UE-EUTRA-Capability-v1020-IEs   OPTIONAL
}
UE-EUTRA-Capability-v1020-IEs ::=   SEQUENCE {
...
    nonCriticalExtension        UE-EUTRA-Capability-v11xy-IEs
OPTIONAL
}
UE-EUTRA-Capability-v11xy-IEs ::=   SEQUENCE {
    rf-Parameters-v11xy         RF-Parameters-v11xy             OPTIONAL,
    nonCriticalExtension        SEQUENCE    {}                  OPTIONAL
}
```

Example: SIMULTANEOUS TRANSMISSION/RECEPTION Capability FOR EACH CABandClass (COMMON TO DL AND UL)

```
RF-Parameters-v11xy ::=         SEQUENCE {
    supportedBandCombination-r11    SupportedBandCombination-r11
}

SupportedBandCombination-r11 ::= SEQUENCE (SIZE (1..maxBandComb-r11)) OF BandCombinationParameters-
r11

BandCombinationParameters-r11 ::= SEQUENCE (SIZE (1..maxSimultaneousBands-r11)) OF BandParameters-
r11

BandParameters-r11 ::= SEQUENCE {
    bandEUTRA-r10               INTEGER   (1..64),
    bandParametersUL-r11        BandParametersUL-r11            OPTIONAL,
    bandParametersDL-r11        BandParametersDL-r11            OPTIONAL
}

BandParametersUL-r11 ::= SEQUENCE (SIZE (1..maxBandwidthClass-r11)) OF CA-MIMO-ParametersUL-r11

CA-MIMO-ParametersUL-r11 ::= SEQUENCE {
    ca-BandwidthClassUL-r10     CA-BandwidthClass-r10,
    simultaneousTx-r11          ENUMERATED{supported}           OPTIONAL
    supportedMIMO-CapabilityUL-r10  MIMO-CapabilityUL-r10       OPTIONAL
}

BandParametersDL-r11 ::= SEQUENCE (SIZE (1..maxBandwidthClass-r11)) OF CA-MIMO-ParametersDL-r11

CA-MIMO-ParametersDL-r11 ::= SEQUENCE {
    ca-BandwidthClassDL-r10     CA-BandwidthClass-r10,
    simultaneousTxRx-r11        ENUMERATED{supported}           OPTIONAL
    supportedMIMO-CapabilityDL-r10  MIMO-CapabilityDL-r10       OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10               INTEGER   (1..64),
    bandParametersUL-r10        BandParametersUL-r10            OPTIONAL,
    bandParametersDL-r10        BandParametersDL-r10            OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10     CA-BandwidthClass-r10,
    supportedMIMO-CapabilityUL-r10  MIMO-CapabilityUL-r10       OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10     CA-BandwidthClass-r10,
    supportedMIMO-CapabilityDL-r10  MIMO-CapabilityDL-r10       OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 18

UE-EUTRA-Capability information element

```
-- ASN1START
UE-EUTRA-Capability ::=        SEQUENCE {
...
    },
    nonCriticalExtension           UE-EUTRA-Capability-v920-IEs      OPTIONAL
}
UE-EUTRA-Capability-v920-IEs  ::=    SEQUENCE    {
...
    nonCriticalExtension           UE-EUTRA-Capability-v940-IEs      OPTIONAL
}
UE-EUTRA-Capability-v940-IEs ::=   SEQUENCE {
    lateNonCriticalExtension       OCTET      STRING                 OPTIONAL,
    nonCriticalExtension           UE-EUTRA-Capability-v1020-IEs     OPTIONAL
}
UE-EUTRA-Capability-v1020-IEs ::=  SEQUENCE {
...
    nonCriticalExtension           UE-EUTRA-Capability-v11xy-IEs
    OPTIONAL
}
UE-EUTRA-Capability-v11xy-IEs ::=  SEQUENCE {
    rf-Parameters-v11xy            RF-Parameters-v11xy               OPTIONAL,
    nonCriticalExtension           SEQUENCE       {}                 OPTIONAL
}
```

Example: SIMULTANEOUS TRANSMISSION/RECEPTION Capability FOR EACH CABandClass (INDIVIDUAL FOR DL AND UL)

```
RF-Parameters-v11xy   ::=        SEQUENCE   {
    supportedBandCombination-r11        SupportedBandCombination-r11
}

SupportedBandCombination-r11 ::= SEQUENCE (SIZE (1..maxBandComb-r11)) OF BandCombinationParameters-
r11

BandCombinationParameters-r11 ::= SEQUENCE (SIZE (1..maxSimultaneousBands-r11)) OF BandParameters-
r11

BandParameters-r11 ::= SEQUENCE {
    bandEUTRA-r10                  INTEGER   (1..64),
    bandParametersUL-r11           BandParametersUL-r11              OPTIONAL,
    bandParametersDL-r11           BandParametersDL-r11              OPTIONAL
}

BandParametersUL-r11 ::= SEQUENCE (SIZE (1..maxBandwidthClass-r11)) OF CA-MIMO-ParametersUL-r11

CA-MIMO-ParametersUL-r11 ::= SEQUENCE {
    ca-BandwidthClassUL-r10        CA-BandwidthClass-r10,
    simultaneousTx-r11             ENUMERATED{supported}             OPTIONAL
    supportedMIMO-CapabilityUL-r10 MIMO-CapabilityUL-r10             OPTIONAL
}

BandParametersDL-r11 ::= SEQUENCE (SIZE (1..maxBandwidthClass-r11)) OF CA-MIMO-ParametersDL-r11

CA-MIMO-ParametersDL-r11 ::= SEQUENCE {
    ca-BandwidthClassDL-r10        CA-BandwidthClass-r10,
    simultaneousTx-r11             ENUMERATED{supported}             OPTIONAL
    simultaneousRx-r11             ENUMERATED{supported}             OPTIONAL
    supportedMIMO-CapabilityDL-r10 MIMO-CapabilityDL-r10             OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                  INTEGER    (1..64),
    bandParametersUL-r10           BandParametersUL-r10              OPTIONAL,
    bandParametersDL-r10           BandParametersDL-r10              OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10        CA-BandwidthClass-r10,
    supportedMIMO-CapabilityUL-r10 MIMO-CapabilityUL-r10             OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10        CA-BandwidthClass-r10,
    supportedMIMO-CapabilityDL-r10 MIMO-CapabilityDL-r10             OPTIONAL
}
CA-BandwidthClass-r10  ::= ENUMERATED {a, b, c, d, e, f, ...}
MIMO-CapabilityUL-r10  ::= ENUMERATED {twoLayers, fourLayers}
MIMO-CapabilityDL-r10  ::= ENUMERATED {twoLayers, fourLayers, eightLayers}

-- ASN1STOP
```

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

Nowadays, "Inter-band CA (Carrier Aggregation)" is studied in the meetings for developing LTE (Long Term Evolution) specifications.

As shown in FIG. 21, a conventional radio configuration for implementing "Inter-band CA" includes a duplexer #A for switching transmission and reception in a band #A, a duplexer #B for switching transmission and reception in a band #B, and a diplexer in which the duplexer #A and the duplexer #B are housed.

PRIOR ART DOCUMENT

Non-Patent Document

Non-patent document 1: 3GPP TS36.101

SUMMARY OF THE INVENTION

However, in a conventional radio configuration for implementing the mobile communication system of the FDD mode, a duplexer is inserted to suppress leakage from an uplink band to a downlink band in the same band.

On the other hand, in "Inter-band CA", a downlink band in a band concerned may receive a leakage of a signal from an uplink band transmitted on a different band.

In order to suppress the leakage, insertion of an additional diplexer is under consideration.

For example, as shown in FIG. 21, duplexers #A/#B are inserted to suppress leakages of signals (indicated with solid lines in FIG. 21) from uplink bands to downlink bands in bands #A/#B.

In addition, a diplexer is similarly inserted to suppress a leakage of a signal (indicated with a dotted line in FIG. 21) from an uplink band in the band #A to a downlink band in the band #B.

Here, to reduce influence of a signal leakage from an uplink band to a downlink band in the same band via the diplexer, "REFSENS" and the like are provided in LTE (Release 8).

Further, discussion for a case of utilizing only a single band as the uplink is underway presently.

However, as for the signal leakage from an uplink band to a downlink band between different bands via the diplexer, no measures have been taken for a case where signals are generated from multiple uplink bands.

Such leakage particularly causes problems such as the spurious emission in transmission, deterioration of the reception sensitivity, and decrease of the transmission power.

The present invention has been made in view of the above-mentioned problem. An objective of the present invention is to provide a mobile communication method, a radio base station, and a mobile station, which are capable of improving communication quality of uplink CA by keeping down the suppression performance capability of a diplexer usually needed to suppress a leakage from an uplink band to a downlink band in uplink CA, and by improving the passage loss of the diplexer with the effect thus produced.

A first feature of the present invention is summarized as a mobile communication method in a mobile communication system capable of performing uplink carrier aggregation using different frequency carriers, the method including the steps of: transmitting simultaneous transmission capability information from a mobile station to a radio base station, the simultaneous transmission capability information indicating whether or not the mobile station can transmit uplink data signals via multiple carriers in a same sub-frame while performing the uplink carrier aggregation; and performing scheduling for the mobile station by the radio base station on the basis of the simultaneous transmission capability information.

A second feature of the present invention is summarized as a mobile communication method in a mobile communication system capable of performing uplink carrier aggregation using different frequency carriers, the method including the steps of: transmitting simultaneous transmission capability information from a mobile station to a radio base station, the simultaneous transmission capability information indicating whether or not the mobile station can guarantee predetermined communication quality in transmission of uplink data signals via multiple carriers in a same sub-frame while performing the uplink carrier aggregation; and performing scheduling for the mobile station by the radio base station on the basis of the simultaneous transmission capability information.

A third feature of the present invention is summarized as a radio base station used in a mobile communication system capable of performing uplink carrier aggregation using different frequency carriers, the radio base station including: a receiver unit configured to receive simultaneous transmission capability information from a mobile station, the simultaneous transmission capability information indicating whether or not the mobile station can transmit uplink data signals via multiple carriers in a same sub-frame while performing uplink carrier aggregation; and a scheduling unit configured to perform scheduling for the mobile station on the basis of the simultaneous transmission capability information.

A fourth feature of the present invention is summarized as a radio base station used in a mobile communication system capable of performing uplink carrier aggregation using different frequency carriers, the radio base station including: a receiver unit configured to receive simultaneous transmission capability information from a mobile station, the simultaneous transmission capability information indicating whether or not the mobile station can guarantee predetermined communication quality in transmission of uplink data signals via multiple carriers in a same sub-frame while performing the uplink carrier aggregation; and a scheduling unit configured to perform scheduling for the mobile station on the basis of the simultaneous transmission capability information.

A fifth feature of the present invention is summarized as a mobile station used in a mobile communication system capable of performing uplink carrier aggregation using different frequency carriers, the mobile station including: a transmitter unit configured to transmit simultaneous transmission capability information to a radio base station, the simultaneous transmission capability information indicating whether or not the mobile station can transmit uplink data signals via multiple carriers in a same sub-frame while performing the uplink carrier aggregation.

A sixth feature of the present invention is summarized as a mobile station used in a mobile communication system capable of performing uplink carrier aggregation using different frequency carriers, the mobile station including: a transmitter unit configured to transmit simultaneous transmission capability information to a radio base station, the simultaneous transmission capability information indicating whether or not the mobile station can guarantee predetermined communication quality in transmission of uplink data signals via multiple carriers in a same sub-frame while performing the uplink carrier aggregation.

BRIEF DESCRIPTION OF THE DRAWINGS

FIG. 3 is an example of "UE-EUTRA-Capability" transmitted by the mobile station according to the first embodiment of the present invention.

FIG. 4 is an example of "CA Bandwidth Class" in "UE-EUTRA-Capability" transmitted by the mobile station according to the first embodiment of the present invention.

FIG. 5 is another example of "UE-EUTRA-Capability" transmitted by the mobile station according to the first embodiment of the present invention.

FIG. 6 is another example of "CA Bandwidth Class" in "UE-EUTRA-Capability" transmitted by the mobile station according to the first embodiment of the present invention.

FIG. 7 is another example of "UE-EUTRA-Capability" transmitted by the mobile station according to the first embodiment of the present invention.

FIG. 8 is another example of "UE-EUTRA-Capability" transmitted by the mobile station according to the first embodiment of the present invention.

FIG. 9 is another example of "UE-EUTRA-Capability" transmitted by the mobile station according to the first embodiment of the present invention.

FIG. 10 is another example of "UE-EUTRA-Capability" transmitted by the mobile station according to the first embodiment of the present invention.

FIG. 11 is another example of "UE-EUTRA-Capability" transmitted by the mobile station according to the first embodiment of the present invention.

FIG. 12 is another example of "UE-EUTRA-Capability" transmitted by the mobile station according to the first embodiment of the present invention.

FIG. 13 is another example of "UE-EUTRA-Capability" transmitted by the mobile station according to the first embodiment of the present invention.

FIG. 14 is another example of "UE-EUTRA-Capability" transmitted by the mobile station according to the first embodiment of the present invention.

FIG. 15 is another example of "UE-EUTRA-Capability" transmitted by the mobile station according to the first embodiment of the present invention.

FIG. 16 is another example of "UE-EUTRA-Capability" transmitted by the mobile station according to the first embodiment of the present invention.

FIG. 17 is another example of "UE-EUTRA-Capability" transmitted by the mobile station according to the first embodiment of the present invention.

FIG. 18 is another example of "UE-EUTRA-Capability" transmitted by the mobile station according to the first embodiment of the present invention.

DETAILED DESCRIPTION

Mobile Communication System According to the First Embodiment of the Present Invention A mobile communication system according to the first embodiment of the present invention will be described with reference to FIGS. 1 to 20.

The mobile communication system according to this embodiment supports LTE-Advanced and is configured to be capable of performing at least either of "Inter-band CA (DL/UL)" or "Intra-band CA (DL/UL)".

Figure 1:
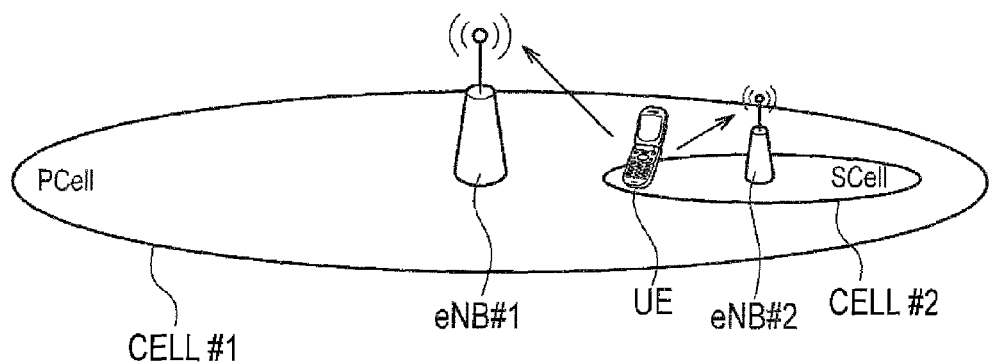
FIG. 1 is an overall configuration view of a mobile communication system according to a first embodiment of the present invention.

As shown in FIG. 1, the mobile communication system according to this embodiment includes a radio base station eNB#1 configured to manage a cell #1, and a radio base station eNB#2 configured to manage a cell #2 in an area covered by the cell #1.

Here, the cell #1 is a cell (for example, a macro cell) operated by a frequency carrier in a coverage band (for example, a band #A) supporting a wide area, and the cell #2 is a cell (for example, a pico cell) operated by a frequency carrier in a capacity band (for example, a band #B) for improving the throughput at a hot spot.

In an example of FIG. 1, the cell #1 is set as "Primary Cell (hereinafter, referred to as Pcell)" for a mobile station UE, and the cell #2 is set as "Secondary Cell (hereinafter, referred to as Scell)" for the mobile station UE.

Figure 2:
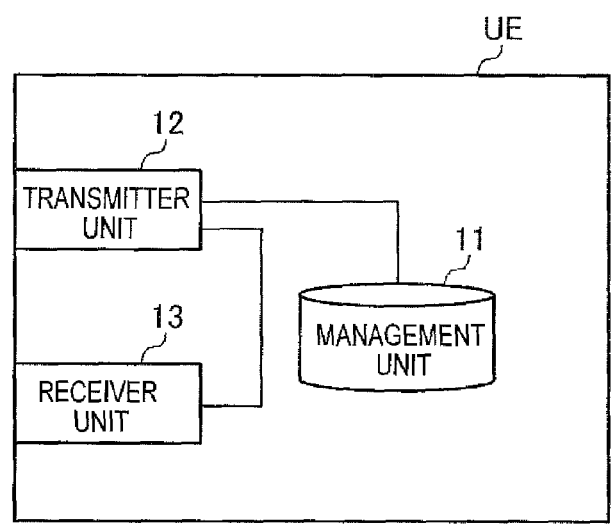
FIG. 2 is a functional block diagram of a mobile station according to the first embodiment of the present invention.

As shown in FIG. 2, the mobile station UE according to this embodiment includes a management unit 11, a receiver unit 12, and a transmitter unit 13.

The management unit 11 is configured to manage capability information of the mobile station UE. For example, the management unit 11 is configured to manage simultaneous transmission capability information as one of the capability information of the mobile station UE.

Here, the simultaneous transmission capability information may be information indicating whether or not the mobile station UE can transmit uplink data signals via multiple carriers in the same sub-frame while performing uplink CA, or may be information indicating whether or not the mobile station UE can guarantee predetermined communication quality in transmission of uplink data signals via multiple carriers in the same sub-frame while performing uplink CA.

The receiver unit 12 is configured to receive various signals transmitted by the radio base station eNB.

For example, the receiver unit 12 may be configured to receive a scheduling signal in an uplink or a downlink from the radio base station eNB.

The transmitter unit 13 is configured to transmit various signals to the radio base station eNB.

For example, the transmitter unit 13 may be configured to transmit the above-mentioned simultaneous transmission capability information as one of the capability information of the mobile station UE to the radio base station eNB.

As shown in FIG. 3, the transmitter unit 13 may be configured to transmit the simultaneous transmission capability information through "CA-BandwidthClass-r10" in "UE-SUTRA-Capability".

In this case, the mobile station UE and the radio base station eNB manage a table shown in FIG. 4, and "Number of simultaneous transmission" associated with "CA-BandwidthClass-r10" indicates the number of carriers through which the mobile station UE can transmit uplink data signals in the same sub-frame while performing uplink CA, or the number of carriers through which the mobile station can guarantee predetermined communication quality in transmission of uplink data signals in the same sub-frame while performing uplink CA.

As shown in FIG. 5, the transmitter unit 13 may be configured to transmit the simultaneous transmission capability information through "CA-BandwidthClass-r10" in "UE-EUTRA-Capability".

In this case, the mobile station UE and the radio base station eNB manage a table shown in FIG. 6, and "Number of simultaneous UL transmission" associated with "CA-BandwidthClass-r10" indicates the number of carriers through which the mobile station UE can transmit the uplink data signals in the same sub-frame while performing uplink CA, or the number of carriers through which the mobile station UE can guarantee predetermined communication quality in transmission of uplink data signals in the same sub-frame while performing uplink CA. Also, "Number of simultaneous DL transmission" associated with "CA-BandwidthClass-r10" indicates the number of carriers through which the mobile station UE can receive the downlink data signals in the same sub-frame while performing downlink CA, or the number of carriers through which the mobile station UE can guarantee predetermined communication quality in reception of downlink data signals in the same sub-frame while performing downlink CA.

As shown in FIG. 7, the transmitter unit 13 may be configured to transmit the simultaneous transmission capability information through "simultaneousTx-r11" in "RF-Parameters-v11xy" in "UE-SUTRA-Capability-v11xy-IEs" in "UE-EUTRA-Capability".

In this case, through "simultaneousTx-r11", the transmitter unit 13 notifies only whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA).

As shown in FIG. 8, the transmitter unit 13 may be configured to transmit the simultaneous transmission capability information through "simultaneousTxRx-r11" in "RF-Parameters-v11xy" in "UE-EUTRA-Capability-v11xy-IEs" in "UE-EUTRA-Capability".

In this case, through "simultaneousTxRx-r11", the transmitter unit 13 notifies whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA), and whether or not the mobile station UE can receive downlink data signals via multiple carriers in the same sub-frame while performing downlink CA (or, whether or not the mobile station UE can guarantee the predetermined communication quality in reception of downlink data signals via multiple carriers in the same sub-frame while performing downlink CA).

As shown in FIG. 9, the transmitter unit 13 may transmit the simultaneous transmission capability information through "simultaneousTx-r11" and "simultaneousTx-r11" in "RF-Parameters-v11xy" in "UE-EUTRA-Capability-v11xy-IEs" in "UE-EUTRA-Capability".

In this case, the transmitter unit 13 notifies through "simultaneousTx-r11" whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA), and also notifies through "simultaneousRx-r11" whether or not the mobile station UE can receive downlink data signals via multiple carriers in the same sub-frame while performing downlink CA (or, whether or not the mobile station UE can guarantee the predetermined communication quality in reception of downlink data signals via multiple carriers in the same sub-frame while performing downlink CA).

As shown in FIG. 10, the transmitter unit 13 may be configured to transmit the simultaneous transmission capability information through "simultaneousTx-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, through "simultaneousTx-r11", the transmitter unit 13 notifies, for each band combination, whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA).

As shown in FIG. 11, the transmitter unit 13 may be configured to transmit the simultaneous transmission capability information through "simultaneousTxRx-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, through "simultaneousTxRx-r11", the transmitter unit 13 notifies, for each band combination, whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA), and whether or not the mobile station UE can receive downlink data signals via multiple carriers in the same sub-frame while performing downlink CA (or whether or not the mobile station UE can guarantee the predetermined communication quality in reception of downlink data signals via multiple carriers in the same sub-frame while performing downlink CA).

As shown in FIG. 12, the transmitter unit 13 may also be configured to transmit the simultaneous transmission capability information through "simultaneousTx-r11" and "simultaneousRx-r11" in "SupportedBandCombinationParameters-r11" in "SupportedBandCommunication-r11" in "RF-Parameters-v11xy" in "UE-EUTRA-Capability-v11xy-IEs" in "UE-EUTRA-Capability".

In this case, the transmitter unit 13 notifies, through "simutaneousTx-r11" for each band combination, whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA), and notifies, through "simultaneousRx-r11" for each band combination, whether or not the mobile station UE can receive downlink data signals via multiple carriers in the same sub-frame while performing downlink CA (or whether or not the mobile station UE can guarantee the predetermined communication quality in reception of downlink data signals via multiple carriers in the same sub-frame while performing downlink CA).

As shown in FIG. 13, the transmitter unit 13 may be configured to transmit the simultaneous transmission capability information through "simutaneousTx-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, through "simultaneousTx-r11" for each band, the transmitter unit 13 notifies whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA).

As shown in FIG. 14, the transmitter unit 13 may be configured to transmit the simultaneous transmission capability information through "simultaneousTxRx-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, through "simultaneousTxRx-r11" for each band, the transmitter unit 13 notifies whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA), and whether or not the mobile station UE can receive downlink data signals via multiple carriers in the same sub-frame while performing downlink CA (or whether or not the mobile station UE can guarantee the predetermined communication quality in reception of downlink data signals via multiple carriers in the same sub-frame while performing downlink CA).

As shown in FIG. 15, the transmitter unit 13 may be configured to transmit the simultaneous transmission capability information through "simultaneousTx-r11" and "simultaneousRx-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, the transmitter unit 13 notifies, through "simultaneousTx-r11" for each band, whether or not the mobile station UE can transmit uplink data signals via multiple carriers in the same sub-frame while performing uplink CA (or whether or not predetermined communication quality can be guaranteed when the uplink signal is transmitted via multiple carriers in the same sub-frame while performing uplink CA), and notifies, through "simultaneousRx-r11" for each band, whether or not the mobile station UE can receive downlink data signals via multiple carriers in the same sub-frame while performing downlink CA (or whether or not the mobile station UE can guarantee the predetermined communication quality in reception of downlink data signals via multiple carriers in the same sub-frame while performing downlink CA).

As shown in FIG. 16, the transmitted 13 may be configured to transmit the simultaneous transmission capability information through "simultaneousTx-r11" in "CA-MIMO-Parameters-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, through "simultaneousTx-r11" for each CABandClass, the transmitter unit 13 notifies whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA).

As shown in FIG. 17, the transmitter unit 13 may be configured to transmit the simultaneous transmission capability information through "simultaneousTxRx-r11" in "CA-MIMO-Parameters-r11" in "BandParameters-r11" in "SupportedBandCombinationParameters-r11" in "SupportedBandCombination-r11" in "RF-Parameters-v11xy" in "UE-SUTRA-Capability-v11xy-IEs" in "UE-EUTRA-Capability".

In this case, through "simultaneousTxRx-r11" for each CABandClass, the transmitter unit 13 notifies whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA), and notifies whether or not the mobile station UE can receive downlink data signals via multiple carriers in the same sub-frame while performing downlink CA (or whether or not the mobile station UE can guarantee the predetermined communication quality in reception of downlink data signals via multiple carriers in the same sub-frame while performing downlink CA).

As shown in FIG. 18, the transmitter unit 13 may be configured to transmit the simultaneous transmission capability information through "simultaneousTx-r11" and "simultaneousRx-r11" in "CA-MIMO-Parameters-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, the transmitter unit 13 notifies, through "simultaneousTx-r11" for each CABandClass, whether or not the mobile station UE can transmit uplink data signals via multiple carriers in the same sub-frame while performing uplink CA (or whether or not the mobile station UE can guarantee the predetermined communication quality in transmission of uplink data signals via multiple carriers in the same sub-frame while performing uplink CA), and notifies, through "simultaneousRx-r11" for each CABandClass, whether or not the mobile station UE can receive downlink data signals via multiple carriers on the same sub-frame while performing downlink CA (or whether or not the mobile station UE can guarantee the predetermined communication quality in reception of downlink data signals via multiple carriers in the same sub-frame while performing downlink CA).

Further, whether or not the mobile station UE can receive downlink data signals via multiple carriers in the same sub-frame while performing downlink CA (or whether or not the mobile station UE can guarantee the predetermined communication quality in reception of downlink data signals via multiple carriers in the same sub-frame while performing downlink CA) may be notified only when the mobile station UE (or radio base station eNB) supports "Cross Carrier Scheduling".

Figure 21:
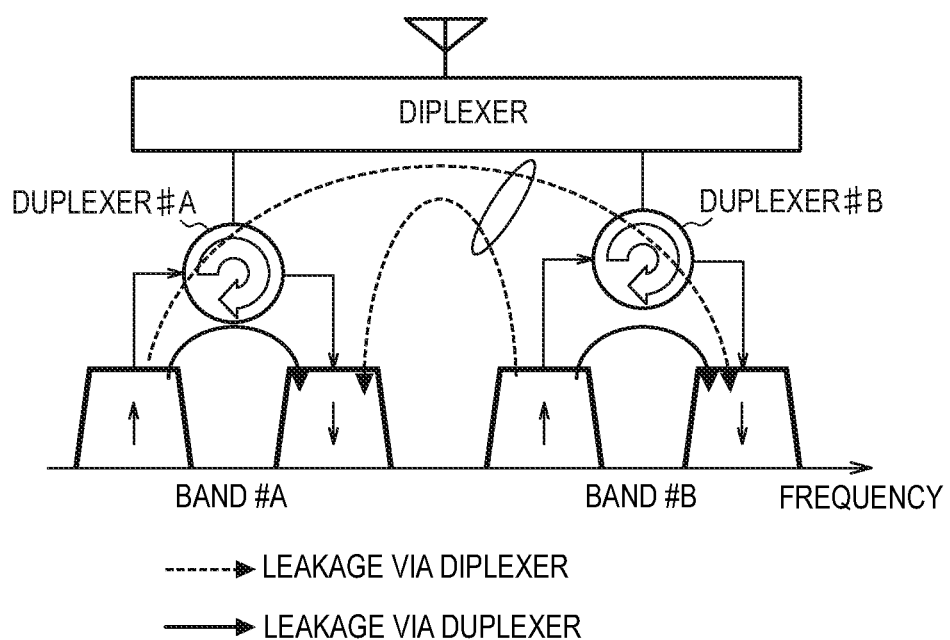
FIG. 21 is a diagram for illustrating problems with a conventional mobile communication system.

Here, the receiver unit 12 and the transmitter unit 13 of the mobile station UE may be configured to include a diplexer and duplexers as shown in FIG. 21.

Figure 19:
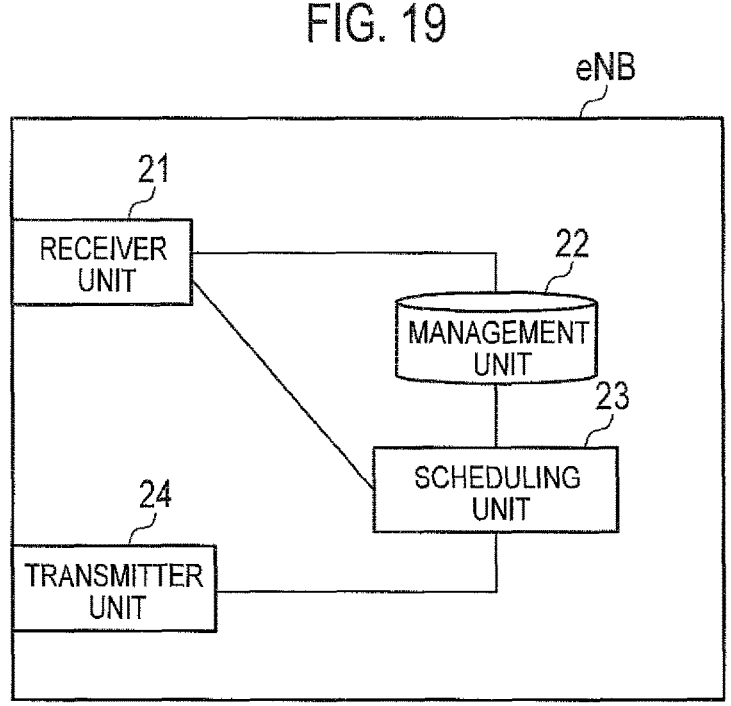
FIG. 19 is a diagram showing an example of a scheduling by the radio base station according to the first embodiment of the present invention.

As shown in FIG. 19, the radio base station eNB includes a receiver unit 21, a management unit 22, a scheduling unit 23, and a transmitter unit 24.

The receiver unit 21 is configured to receive various signals transmitted by the mobile station UE.

For example, the receiver unit 21 may be configured to receive the above-mentioned simultaneous transmission capability information as one of capability information of the mobile station UE from the mobile station UE.

The management unit 22 is configured to manage capability information of the mobile station US. For example, the management unit 22 may be configured to manage the above-mentioned simultaneous transmission capability information as one of capability information of the mobile station US.

The scheduling unit 23 is configured to perform scheduling processing for the mobile station US.

For example, the scheduling unit 23 may be configured to perform scheduling processing for the mobile station UE on the basis of capability information of the mobile station US (above-mentioned simultaneous transmission capability information) managed by the management unit 22.

Figure 20:
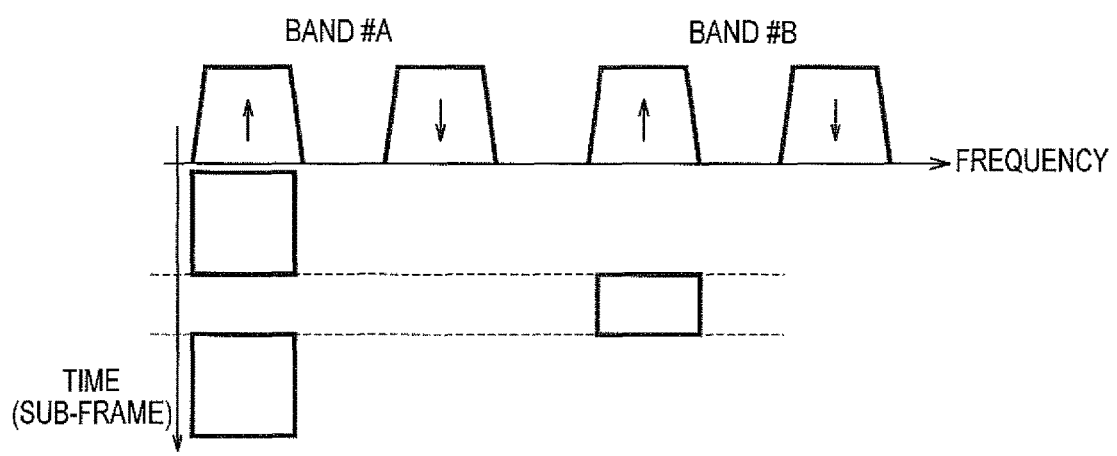
FIG. 20 is a diagram showing an example of a scheduling by the radio base station according to the first embodiment of the present invention.

Specifically, as shown in FIG. 20, when the mobile station US targeted for scheduling cannot transmit uplink data signals via multiple carriers in the same sub-frame while performing uplink CA or cannot guarantee predetermined communication quality in transmission of uplink data signals via multiple carriers in the same sub-frame while performing uplink CA, the scheduling unit 23 may perform scheduling for the mobile station UE such that the mobile station will not transmit uplink data signals via multiple carriers in the same sub-frame while performing uplink CA.

The transmitter unit 24 is configured to transmit various signals to the mobile station UE.

For example, the transmitter unit 24 may be configured to transmit a scheduling signal to the mobile station UE.

The mobile station UE may have a function to perform transmission on only a CC on which an important signal is to be transmitted when the radio base station eNB erroneously allocates multiple CCs to the mobile station UE which cannot transmit uplink data signals via multiple carriers in the same sub-frame while performing uplink CA, as in the case described above.

For example, since PUCCH is a signal having higher level of importance than that of PUSCH, the mobile station UE may have a function to give priority to PUCCH and perform transmission only in an uplink band to which PUCCH is allocated.

In the case mentioned above, signals are transmitted simultaneously and the communication quality may be significantly deteriorated. Such significant deterioration, even if it occurs, does not matter.

According to an aspect of this embodiment, the mobile station UE is configured to transmit the above-mentioned simultaneous transmission capability information to the radio base station eNB, and the radio base station eNB is configured to perform scheduling on the basis of the simultaneous transmission capability information. Since transmission in a same sub-frame is avoided, a leakage from an uplink band to a downlink band in different bands can be suppressed with a simple diplexer. Consequently, communication with a communication capability set to use of a single uplink band can be implemented.

The features of this embodiment described above may be expressed as follows.

A first feature of this embodiment is summarized as a mobile communication method in a mobile communication system capable of performing uplink CA (Carrier Aggregation) using different frequency carriers, the method including the steps of: transmitting simultaneous transmission capability information from a mobile station UE to a radio base station eNB, the simultaneous transmission capability information indicating whether or not the mobile station UE can transmit uplink data signals via multiple carriers in a same sub-frame while performing the uplink CA; and performing scheduling for the mobile station UE by the radio base station eNB on the basis of the simultaneous transmission capability information.

A second feature of this embodiment is summarized as a mobile communication method in a mobile communication system capable of performing uplink CA using different frequency carriers, the method including the steps of: transmitting simultaneous transmission capability information from a mobile station UE to a radio base station eNB, the simultaneous transmission capability information indicating whether or not the mobile station UE can guarantee predetermined communication quality in transmission of uplink data signals via multiple carriers in a same sub-frame while performing the uplink CA; and performing scheduling for the mobile station UE by the radio base station eNB on the basis of the simultaneous transmission capability information.

A third feature of this embodiment is summarized as a radio base station eNB used in a mobile communication system capable of performing uplink CA using different frequency carriers, the radio base station eNB including: a receiver unit 21 configured to receive simultaneous transmission capability information from a mobile station UE, the simultaneous transmission capability information indicating whether or not the mobile station UE can transmit uplink data signals via multiple carriers in a same sub-frame while performing uplink CA; and a scheduling unit 23 configured to perform scheduling for the mobile station UE on the basis of the simultaneous transmission capability information.

A fourth feature of this embodiment is summarized as a radio base station eNB used in a mobile communication system capable of performing uplink CA using different frequency carriers, the radio base station eNB including: a receiver unit 21 configured to receive simultaneous transmission capability information from a mobile station UE, the simultaneous transmission capability information indicating whether or not the mobile station UE can guarantee predetermined communication quality in transmission of uplink data signals via multiple carriers in a same sub-frame while performing the uplink CA; and a scheduling unit 23 configured to perform scheduling for the mobile station UE on the basis of the simultaneous transmission capability information.

A fifth feature of this embodiment is summarized as a mobile station UE used in a mobile communication system capable of performing uplink CA using different frequency carriers, the mobile station UE including: a transmitter unit 12 configured to transmit simultaneous transmission capability information to a radio base station eNB, the simultaneous transmission capability information indicating whether or not the mobile station Of can transmit uplink data signals via multiple carriers in a same sub-frame while performing the uplink CA.

A sixth feature of this embodiment is summarized as a mobile station OF used in a mobile communication system capable of performing uplink CA using different frequency carriers, the mobile station UE including: a transmitter unit 12 configured to transmit simultaneous transmission capability information to a radio base station eNB, the simultaneous transmission capability information indicating whether or not the mobile station UE can guarantee predetermined communication quality in transmission of uplink data signals via multiple carriers in a same sub-frame while performing the uplink CA.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-022547 (filed on Feb. 3, 2012) is incorporated by reference in the present specification.

INDUSTRIAL APPLICABILITY

As described above, the present invention provides a mobile communication method, a radio base station, and a mobile station, capable of improving the communication quality in uplink CA by keeping down the suppression performance capability of the diplexer usually needed to suppress a leakage from an uplink band to a downlink band in uplink CA, and by improving the passage loss of the diplexer with the effect thus produced.

EXPLANATION OF THE REFERENCE NUMERALS

UE mobile station
eNB radio base station
11, 22 management unit
12, 24 transmitter unit
13, 21 receiver unit
23 scheduling unit

The invention claimed is:

1. A mobile communication method in a mobile communication system that performs uplink carrier aggregation using frequency carriers of different bands, the method comprising the steps of:
   transmitting simultaneous transmission capability information from a mobile station to a radio base station, the simultaneous transmission capability information indicating the number of carriers through which the mobile station can guarantee predetermined communication quality in transmission of uplink data signals via a plurality of carriers in a same sub-frame while performing the uplink carrier aggregation; and
   performing scheduling for the mobile station by the radio base station based on the simultaneous transmission capability information such that a signal leakage from an uplink band to a downlink band in the different bands via a diplexer is suppressed.

2. A radio base station used in a mobile communication system that performs uplink carrier aggregation using frequency carriers of different bands, the radio base station comprising:
   a receiver unit configured to receive simultaneous transmission capability information from a mobile station, the simultaneous transmission capability information indicating the number of carriers through which the mobile station can guarantee predetermined communication quality in transmission of uplink data signals via a plurality of carriers in a same sub-frame while performing the uplink carrier aggregation; and
   a scheduling unit configured to perform scheduling for the mobile station based on the simultaneous transmission capability information such that a signal leakage from an uplink band to a downlink band in the different bands via a diplexer is suppressed.

3. A mobile station used in a mobile communication system that performs uplink carrier aggregation using frequency carriers of different bands, the mobile station comprising:
   a transmitter unit configured to transmit simultaneous transmission capability information to a radio base station, the simultaneous transmission capability information indicating the number of carriers through which the mobile station can guarantee predetermined communication quality in transmission of uplink data signals via a plurality of carriers in a same sub-frame while performing the uplink carrier aggregation; and
   a receiver unit configured to receive a scheduling signal in an uplink band, the scheduling signal scheduled by the radio base station based on the simultaneous transmission capability information such that a signal leakage from the uplink band to a downlink band in the different bands via a diplexer is suppressed.

* * * * *